Figure 1:
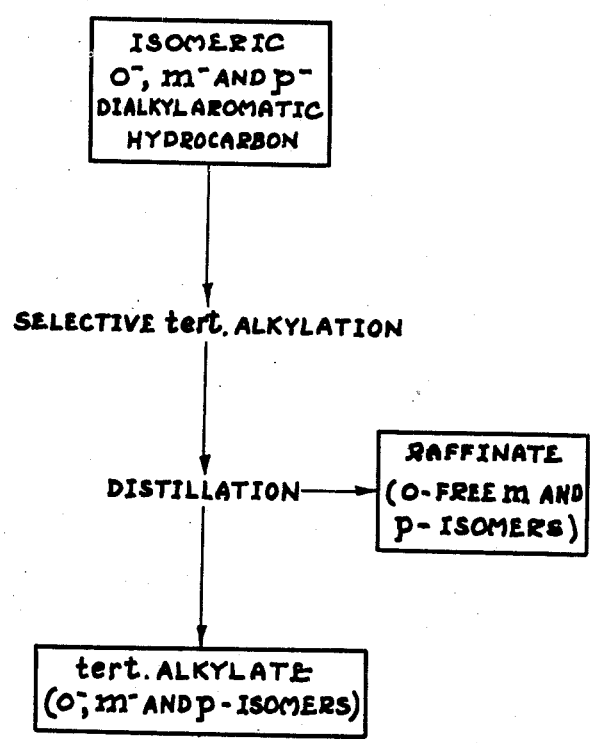

INVENTORS.
BEN BENNETT CORSON
WILLIAM J. HEINTZELMAN
BY RAYMOND C. ODIOSO.
Walter J. Monacelli
his ATTORNEY June 24, 1958  B. B. CORSON ET AL  2,840,621
SEPARATION OF DIALKYLAROMATIC HYDROCARBON ISOMERS
Filed Aug. 7, 1953  2 Sheets-Sheet 2

INVENTORS.
BEN BENNETT CORSON
WILLIAM J. HEINTZELMAN
RAYMOND C. ODIOSO.
BY Walter J. Moracelli
his ATTORNEY.

United States Patent Office 2,840,621
Patented June 24, 1958

2,840,621

SEPARATION OF DIALKYLAROMATIC HYDROCARBON ISOMERS

Ben Bennett Corson, William J. Heintzelman, and Raymond C. Odioso, Pittsburgh, Pa., assignors to Koppers Company, Inc., a corporation of Delaware Application August 7, 1953, Serial No. 372,952

7 Claims. (Cl. 260—674)

This invention relates to the separation of mixed isomeric dialkyl aromatic hydrocarbons containing an ortho-isomer. More particularly, it relates to a method of removing ortho-dialkyl aromatic hydrocarbon from a mixture containing the ortho- and meta- and/or para-isomer.

Many dialkylaromatic hydrocarbons have assumed considerable industrial importance, since they are starting materials for various products. For example, ortho-xylene is oxidized to produce phthalic acid anhydride which is used in the production of plasticizers and resins. Para-xylene is oxidized to give terephthalic acid which is used in the production of a recently developed synthetic fiber. For these and other purposes, it is desired that the individual isomers be obtained as reasonably pure materials. Because of the proximity of their boiling points (138.4° C., 139.2° C., and 144.5° C. for the para-, meta-, and ortho-xylenes, respectively), they are relatively difficult to separate.

In the production of vinyltoluene, ortho-free ethyltoluene is desired as the starting material. If ortho-ethyltoluene is present in the starting material both it and ortho-vinyltoluene impose considerable difficulty upon the separation of vinyltoluene from ethyltoluene. In the absence of ortho-isomers (both vinyl- and ethyl-) the separation of vinyltoluene from ethyltoluene is not much more difficult than the separation of styrene from ethylbenzene. This is indicated by the following table:

TABLE I

| Compound: | B. P., ° C./760 mm. Hg |
|---|---|
| m-Ethyltoluene | 161.3 |
| p-Ethyltoluene | 162.1 |
| o-Ethyltoluene | 165.2 |
| o-Vinyltoluene | 168.6 |
| m-Vinyltoluene | 169.8 |
| p-Vinyltoluene | 170.6 |
| Ethylbenzene | 136.2 |
| Styrene | 145.2 |

Other important separations concern isomeric cymenes (isopropyltoluenes), of which the para-isomer is an intermediate in the preparation of terephthalic acid or of a hydroperoxide useful in the production of p-cresol; isomeric diisopropyl benzenes; isomeric isopropylethylbenzenes; and isomeric diethylbenzenes. All of these isomeric dialkylaromatic hydrocarbons are relatively difficult to separate because of the proximity of their boiling points, as indicated in the following table:

TABLE II

| Compound: | B. P., ° C./760 mm. Hg |
|---|---|
| o-Diethylbenzene | 184 |
| m-Diethylbenzene | 181–2 |
| p-Diethylbenzene | 182–3 |
| o-Isopropyltoluene | 175 |
| m-Isopropyltoluene | 176 |
| p-Isopropyltoluene | 177 |
| o-Diisopropylbenzene | 203.75 |
| m-Diisopropylbenzene | 203.18 |
| p-Diisopropylbenzene | 210.37 |
| o-Isopropylethylbenzene | 193 |
| m-Isopropylethylbenzene | 192 |
| p-Isopropylethylbenzene | 196.6 |

For the purposes of this invention "ortho-free" is generally intended to mean containing no more than about 1% ortho-isomer. However, while it is generally desirable to obtain a product containing as little ortho-isomer as possible, it is contemplated that where in some cases even larger amounts of the ortho-isomer are not objectionable, the present invention can be practiced in such a manner as to merely reduce the ortho-isomer content and not to remove the ortho-isomer content completely to the degree possible.

In accordance with the present invention, it has now been discovered that dialkyl aromatic hydrocarbons can be alkylated with a tertiary-alkylating agent so that the ortho-isomer is selectively tertiary-alkylated to substantial exclusion of the meta- and para-isomers, and the alkylate formed is predominantly that of the ortho-isomer. Thereafter, the alkylated mixture is distilled to separate a relatively low boiling meta- and/or para-isomer raffinate and a relatively high boiling tertiary-alkylated ortho-isomer. The tertiary-alkylated ortho-isomer can then be dealkylated to recover the ortho-dialkylaromatic hydrocarbon. Again, since the recovered ortho-isomer can be isomerized, it is possible by isomerization and recycling to increase the yield of meta- and para-isomers for a given mixture of isomeric dialkylaromatic hydrocarbons.

Figure 2:
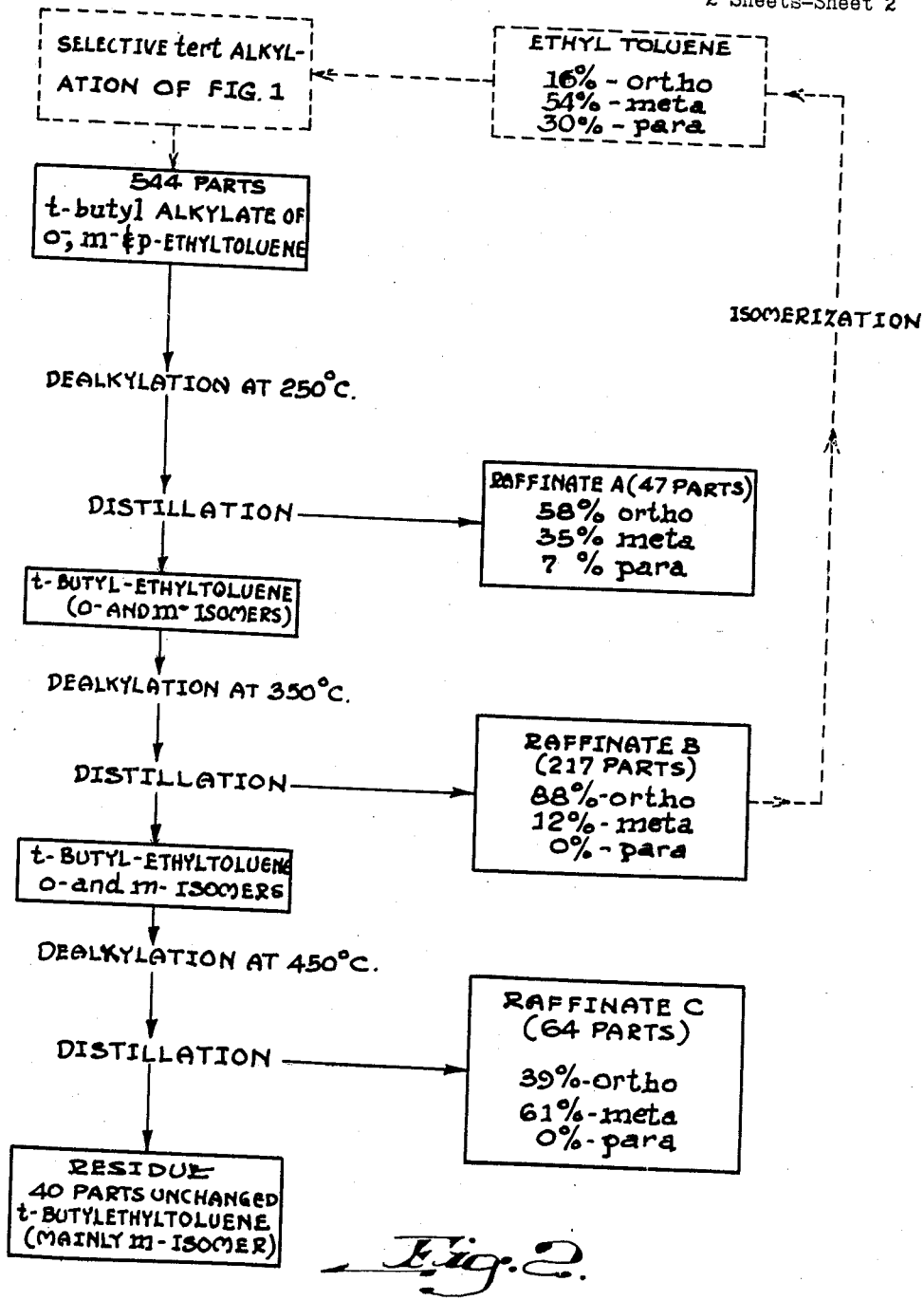

Various methods of practicing the present invention are illustrated by the drawings. Figure 1 shows the steps involved in removing or reducing the ortho-isomer content in a mixture of dialkylaromatic hydrocarbon isomers. Examples 1–5, and 7–9 illustrate these steps in greater detail. Figure 2 illustrates, by the data of Example 6, how a tertiary-alkylate, as produced by the steps of Figure 1, can be selectively dealkylated to give raffinate A which contains all the para-isomer that was alkylated. Raffinates B and C are free of para-isomer.

Any of these raffinates, advantageously one or more containing a high proportion of an undesirable isomer, can be isomerized according to prior art isomerization procedures, for example using catalysts such as cited herein as alkylation catalysts, to give a mixture of isomers containing higher proportions of the desired isomer or isomers. The dotted line section of Figure 2 and Example 10 illustrate this with respect to isomerization of raffinate B and indicate how the isomerized product can be put through the tertiary alkylation process.

By tertiary-alkylating agent is meant an alkylating agent which has a reactive carbon atom attached to three other carbon atoms, such as t-butyl chloride, t-butanol, isobutylene, 2-chloro-2-methylbutane, 2-methylbutene-2, etc., including, in addition to halides, olefins and other alkylating agents in which the reactive carbon is doubly bonded or has halogen or hydroxy group attached thereto, those compounds which sometimes under alkylating conditions react in a manner to give t-alkyl derivatives, such as 2-methylbutene-3, 2-chloro-2-methylbutane, 2-methylpentene-3, etc.

In practicing the invention, a mixture of ortho-dialkyl-aromatic hydrocarbon with meta- and/or para-dialkyl-aromatic hydrocarbon isomeric therewith is subjected to tertiary-alkylation with a tertiary-alkylating agent, such as isobutylene; isoamylenes, such as 2-methylbutene-1, 2-methylbutene-2; isohexylenes, such as 2-methylpentene-1, 2-methylpentene-2, 3-methylpentene-2, and 2,3-dimethylbutene-2; tertiary octylenes, such as 2,2,4-trimethylpentene-3, 2,2,4-trimethylpentene-4, 2,4-dimethylhexene-2, and 2,4-dimethylhexene-3; corresponding tertiary-alcohols, such as t-butanol, t-amyl alcohol, 2,4,4-trimethylpentanol-2, etc.; and corresponding tertiary-alkyl halides, such as tertiary-butyl chloride, tertiary-amyl chloride, 2-methyl-2-chloro-heptane, etc., or mixtures of any two or more thereof. Various well-known alkylation catalysts, such as boron trifluoride, hydrogen fluoride, $H_2SO_4$, ferric chloride, various clay-type alkylation catalysts including the synthetic alumina-silica types, etc. may be used, but hydrogen fluoride, $H_2SO_4$, and ferric chloride alone or with hydrogen chloride are advantageous.

For efficient separation a ratio of one mole or more of alkylating agent per mole of ortho-dialkylaromatic hydrocarbon is desirable. While larger proportions of alkylating agents can often be used, there is generally no advantage in using more than four moles of alkylating agent per mole of ortho-isomer, particularly with the xylenes since with considerable excess of alkylating agent the yield of unalkylated meta-xylene and even unalkylated para-xylene is reduced. With dialkyl aromatic hydrocarbons containing at least one ethyl or isopropyl group tertiary-alkylation is more selective than with the xylenes. The optimum ratio will vary with the particular catalyst being used, generally in accordance with the competing tendency of the catalyst to promote polymerization by-products. For example hydrogen fluoride, which has been found to give about the least amount of polymer by-products, can be used advantageously to give approximately complete removal of the ortho-isomer when used with an alkylation agent to o-isomer ratio of at least approximately 1.3 to 1. With other catalysts which give more polymer by-products, such as $H_2SO_4$, for approximately complete removal of ortho isomer a mole ratio of 2–4 to 1 is advantageous. A reaction temperature in the range of −5 to 25° C. is also advantageous.

It was surprising to find that a mixture of isomeric dialkylaromatic hydrocarbons containing ortho-isomer could be selectively tertiary-alkylated according to this method, since many other substituted aromatic compounds could not be selectively tertiary-alkylated. For instance, the isomeric cresols, ethylphenols, isopropylphenols and mono-methylnaphthalenes could not be selectively tertiary-alkylated. Furthermore, alkylating agents which did not give a tertiary-alkylated product could not be used to selectively alkylate ortho-isomer. Selective ethylation, isopropylation and secondary-butylation was not found possible.

Dealkylation of the tertiary-alkylate can be effected advantageously with any dealkylation catalyst which does not cause isomerization. The tertiary-alkylate is heated at a temperature sufficient to dealkylate the tertiary-alkyl derivative in the presence of a dealkylation catalyst. It has been found that a clay-type dealkylation catalyst, such as Attapulgus clay, Georgia clay, Floridin and fuller's earth, can be used very effectively in the dealkylation of the tertiary-alkylated dialkylaromatic hydrocarbons.

With isomeric tertiary-alkylated dialkylaromatic hydrocarbons, it is found that the para-isomer is the most readily sprung or dealkylated, the meta-isomer is the least readily sprung, while the ortho-isomer is intermediate with respect to difficulty in springing from its tertiary-alkylate. This makes it possible by selection of the proper dealkylation temperature to selectively dealkylate the various isomers.

Of course the dealkylation temperature will vary according to the particular dialkylbenzene, the particular t-alkyl group present and the particular dealkylation catalyst being used. However, it has been found that generally with respect to t-alkyl derivatives of isomeric dialkyl aromatic hydrocarbons which have only methyl and/or ethyl groups before t-alkylation, the t-alkyl groups can be removed in the presence of a clay-type catalyst from the para-isomer at a temperature range of about 250–300° C., from the ortho-isomer at a temperature range of about 325–400° C., and from the meta-isomer at a temperature above about 425° C. With isopropyl groups present in the isomers, greater care must be taken in selecting the dealkylation conditions so as to avoid or minimize dealkylation of the isopropyl groups.

For example, in selective dealkylation of tertiary-alkylate containing a relatively small amount of para-isomer, a larger amount of meta-isomer and a preponderance of ortho-isomer, the tertiary-alkylate is passed over a clay-type catalyst at a temperature sufficient to spring the small amount of para-dialkylaromatic hydrocarbon from its tertiary-alkylate. After separation of the sprung isomer, the residue can be further dealkylated directly or first distilled to separate a fraction of tertiary-alkyl ortho- and meta-dialkylaromatic hydrocarbons. This fraction is then passed over the clay-type catalyst at a higher temperature sufficient to spring the ortho-dialkylaromatic hydrocarbon to the substantial exclusion of the meta-isomer, and the catalyzate is distilled to separate ortho-dialkylaromatic hydrocarbon from unreacted tertiary-alkylate. The latter is then dealkylated at a still higher temperature sufficient to spring the meta-isomer from its tertiary alkylate and the catalyzate is distilled to recover meta-dialkylaromatic hydrocarbon.

The following examples illustrate the present invention. Proportions are by weight, unless otherwise indicated. Various isomer contents are determined by spectrometric analysis with infrared.

*Example 1*

To 318 parts (3 moles) of cold (0–10° C.) xylene (composition: 14% ortho, 59% meta, 27% para) contained in a flask equipped with stirrer, thermometer, and gas inlet tube, is added 150 parts of 96% sulfuric acid. To the stirred cooled (0–10° C.) mixture is added 55 parts (0.97 mole) of isobutylene over a period of two hours. (The $C_4H_8$ to $C_8H_{10}$ mole ratio is 2.3:1.) The reaction mixture is poured onto ice and separated. The hydrocarbon layer is washed, dried and distilled to give 214 parts of raffinate (composition: 0% ortho, 66% meta, 34% para) as determined spectrometrically and 95 parts of selective alkylate. The alkylate boils at 205–220° C., compared with boiling points of 139.2° C. for m-xylene and 138.4° C. for p-xylene.

This procedure is repeated using, instead of isobutylene, 2-methylbutene-1, 2-methylpentene-1, and 2,2,4-trimethylpentene-3 as alkylating agents and similar advantageous results are obtained.

*Example 2*

To 268 parts (2 moles) of cold (0–10° C.) diethylbenzene (composition: 35% ortho, 36% meta, 29% para) contained in a flask equipped with a stirrer, a thermometer, and gas inlet tube, is added 120 parts of 96% sulfuric acid. To the stirred, cooled (0–10° C.) mixture is added 103 parts (1.8 moles) of isobutylene during 1.5 hours. The $C_4H_8$:o-$C_{10}H_{14}$ mole ratio is 2.6:1. The reaction mixture is poured onto ice and separated. The hydrocarbon layer is washed, dried and distilled to give 90 parts of raffinate (0.7 mole, composition: 0% ortho, 45% meta, 55% para) and 167 parts (0.9 mole) of selective alkylate.

*Example 3*

To 360 g. (3 moles) of cold (0–10° C.) ethyltoluene (composition: 12% ortho, 62% meta, 26% para) contained in a flask equipped with stirrer, thermometer, and gas inlet tube, is added 25 cc. of 96% sulfuric acid. To the stirred, cooled (0–10° C.) mixture is added 40 g. (0.7 mole) of isobutylene during 2 hours. (The $C_4H_8$:o-$C_9H_{12}$ mole ratio is 2:1.) The reaction mixture is poured onto ice and separated. The hydrocarbon layer is washed, dried and distilled to give 281 g. of raffinate (2.3 moles, composition: 0% ortho, 67% meta, 33% para) and 76 g. (0.4 mole) of selective alkylate.

*Example 4*

To 240 g. (2 moles) of cold (0–5° C.) ethyltoluene (composition: 21% ortho, 49% meta, 30% para) contained in a 500-cc. flask equipped with stirrer, thermometer, and dropping funnel is added 24 g. (0.15 mole) of anhydrous ferric chloride. To the stirred, cooled (0–5° C.) mixture, 77.4 g. (0.84 mole) of t-butyl chloride is added during 1 hour. (The $C_4H_9Cl$:o-$C_9H_{12}$ mole ratio is 2:1.) The mixture is stirred for an additional hour, poured onto cracked ice, and separated. The hydrocarbon layer is washed, dried and distilled to give 150 g. (1.3 moles) of raffinate (composition: 0% ortho, 58% meta, 42% para) and 100 g. (0.6 mole) of selective alkylate (t-butylethyltoluene).

This procedure is repeated using, instead of t-butyl chloride, 2-chloro-2-methylbutane, 3-chloro-3-methylpentane, 2-chloro-2-methylhexane, and 2-chloro-2,4,4-trimethylpentane, and similar advantageous results are obtained.

*Example 5*

One hundred eighty-one lbs. (685 moles) of ethyltoluene (composition: 21% ortho, 49% meta, 30% para) is charged to a 50-gallon glass linked jacketed vessel and cooled to 5° C. One and one-half gallons of cold 96% sulfuric acid (102 moles) is added with stirring. Isobutylene [10.7 gallons (432 moles)] is passed into the cold (5–10° C.) stirred mixture during 3.5 hours ($C_4H_8$/o-$C_9H_{12}$ molal=3). After stirring for an additional 0.5 hour, a sample is removed and warmed to room temperature. The non-evolution of isobutylene shows that the reaction is finished. The acid layer is removed and the hydrocarbon layer is stirred with 10 gallons of ice water for 0.5 hour. The water is run off, and the hydrocarbon is stirred for 3 hours at 60° C. with 10 gallons of 10% sodium hydroxide. The caustic is removed and the hydrocarbon is distilled to give 70 lbs. (265 moles) of ethyltoluene raffinate (composition: 0% ortho, 51% meta, 49% para) and 79 lbs. (203 moles) of t-butylethyltoluene (21.5 lbs. boiling at 212–225° C./atm. and 57.5 lbs. boiling at 225–235° C./atm.).

*Example 6* t-Butylethyltoluene (544 g., 3.1 moles is passed at atmospheric pressure and 250° C. through a 100 ml. bed of Attapulgus clay (15–30 mesh) during 3 hours (liquid hourly space velocity 2.0). The catalyzate is distilled at atmospheric pressure through a 27-plate column to separate 47 g. (13% yield) of ethyltoluene (composition: 58% ortho, 35% meta, 7% para). The 465 g. residue (unchanged t-butylethyltoluene) is recycled over Attapulgus clay at 350° C. and a liquid hourly spaced velocity of 2. The catalyzate is distilled as above to separate 217 g. (59% yield) of ethyltoluene (composition 88% ortho, 12% meta, 0% para) and 134 g. of residue. Recycling of this residue at 450° C. and distillation of the catalyzate gives 64 g. (17% yield) of ethyltoluene (composition: 39% ortho, 61% meta, 0% para) and 40 g. of unchanged t-butylethyltoluene. Yields are based on original feed.

Similar advantageous results are obtained using a similar procedure with t-amylethyltoluene, t-octyldiethylbenzene, t-butylxylene, t-butyldiisopropylbenzene, and t-butylisopropyltoluene.

*Example 7*

To 360 g. (3 moles) of cold (0–10° C.) ethyltoluene (composition: 12% ortho, 62% meta, 26% para) contained in a flask equipped with a stirrer, thermometer and addition funnel is added 100 cc. of 96% sulfuric acid. To the stirred, cooled (0–10° C.) mixture is added 76 g. (1.08 moles) of 2-methylbutene-2 during 2 hours. (The $C_5H_{10}$:o-$C_9H_{12}$ mole ratio is 3:1.) The mixture is stirred for an additional hour and separated. The hydrocarbon layer is washed, dried and distilled to give 182 g. (1.5 moles) of raffinate (composition 0% ortho, 60% meta, 40% para) and 168 g. (1.1 moles) of selective alkylate (t-amylethyltoluene).

*Example 8*

One hundred parts (0.75 moles) of isopropyltoluene (composition 10% ortho, 27% meta, 63% para) is charged to a flask equipped with stirrer, thermometer and gas-inlet tube and 45 parts of anhydrous hydrogen fluoride is added. This mixture is cooled to −3° C. and maintained at about 0–5° C. during the addition of 5.5 parts (0.1 moles) of isobutylene over a period of 1.5 hours. (The $C_4H_8$:o-$C_3H_7$—$C_6H_4$—$CH_3$ mole ratio is 1.3:1.) The reaction mass is poured onto 400 parts of ice precooled by Dry Ice and the resultant hydrocarbon layer is washed successively with water, dilute caustic, and water, and then dried and distilled. A raffinate of 81 parts is obtained at 155–185° C., which contains 24% meta and 76% para, and an alkylate fraction of 23 parts is recovered.

*Example 9*

One hundred forty-eight parts (1 mole) of isopropylethylbenzene (composition 5% ortho, 24% meta, 71% para) is charged to a flask equipped with stirrer, thermometer and dropping funnel. One hundred fifty parts of 85% sulfuric acid is added and the resultant mixture is cooled to 0° C. The temperature is maintained at 0–5° C. while 11 parts (0.15 moles) of tertiary butyl alcohol is added over a period of 1.5 hours. The product is poured onto 400 parts of ice and the resultant hydrocarbon layer is washed successively with water, dilute caustic, and water, and then dried and distilled. A raffinate of 128 parts is obtained at 180–205° C. which contains 22% meta and 78% para and an alkylate of 19 parts is recovered. This same procedure used for isopropyltoluene with tertiary amyl alcohol and with 2,4,4-trimethylpentanol-2, in place of isopropylethylbenzene and tertiary butyl alcohol, gives similar advantageous results.

*Example 10*

Two hundred seventeen parts (1.8 moles) of ethyltoluene (composition 88% ortho, 12% meta) is stirred and heated for three hours at about 100° C. with 5 parts of $AlCl_3$, in the presence of 135 parts of diethyltoluene and 70 parts of toluene which serve to repress by-product formation. The product is distilled at 155–175° C. to give 198 parts of ethyltoluene having a composition of 16% ortho, 54% meta and 30% para-isomer.

This same procedure used with isomers of diethylbenzene, diisopropylbenzene, isopropyltoluene, and isopropylethylbenzene produces similar advantageous results. Other isomerization catalysts such as HF, $BF_3$, $FeCl_3$, etc., give similar results.

Since it is obvious in view of the foregoing, that various changes may be made in the above description and examples without departing from the spirit of this invention, it is to be understood that the invention is not to be limited thereto except as set forth in the appended claims.

What is claimed is:

1. In a process for removing an ortho-dialkylaromatic hydrocarbon from a mixture also containing an isomer of the ortho-dialkylaromatic hydrocarbon by means of a selective tertiary-alkylation process whereby the ortho-isomer is substantially alkylated to give a tertiary-alkylate predominantly that of the ortho-isomer together with lesser amounts of the tertiary-alkylate of the meta- and para-isomers, the steps which comprise separating said tertiary-alkylated isomers from the reaction mixture, passing said tertiary-alkylate over a clay dealkylation catalyst at a temperature of from about 250 to 300° C. to spring para-isomer, separating the dealkylate from remaining tertiary-alkylate, passing the remaining tertiary-alkylate over a clay dealkylation catalyst at a higher temperature of from about 325 to 400° C. to spring ortho-isomer, and separating dealkylate from residual tertiary-alkylate.

2. Method of claim 1, in which the hydrocarbons are ethyltoluenes.

3. Method of claim 1, in which the tertiary-alkylated dialkylaromatic hydrocarbons are tertiary-butylated ethyltoluenes, the first dealkylation temperature is about 250° C. and the second dealkylation temperature is about 350° C.

4. A process for selectively dealkylating a mixture of tertiary-alkylated isomeric dialkylaromatic hydrocarbons to regenerate the dialkylaromatic hydrocarbons comprising passing the tertiary-alkylated dialkylaromatic hydrocarbons over a clay dealkylation catalyst at a temperature of from about 250 to 300° C. to spring para-isomer, separating the dealkylate from remaining tertiary-alkylate, passing the remaining tertiary-alkylate over a clay dealkylation catalyst at a higher temperature of from about 325 to 400° C. to spring ortho-isomer, and separating dealkylate from residual tertiary-alkylate.

5. A process of claim 4 in which the residual tertiary-alkylate is passed over a clay dealkylation catalyst at a still higher temperature of from about 425 to 450° C. to spring meta-isomer and recovering the latter.

6. Method of claim 4, in which the dialkylaromatic hydrocarbons are ethyltoluenes.

7. Method of claim 6, in which the tertiary-alkylated dialkylaromatic hydrocarbons are tertiary-butylated ethyltoluenes, the first dealkylation temperature is about 250° C., the second dealkylation temperature is about 350° C. and the final dealkylation temperature is about 450° C.

References Cited in the file of this patent

UNITED STATES PATENTS 2,648,713     Schneider _____ Aug. 11, 1953

OTHER REFERENCES

Nightingale et al.: J. Am. Chem. Soc., vol. 66, 1944, pages 154 and 155.

Francis: Chem. Reviews, vol. 43, October 1948, article appears on pages 257–269.